(12) United States Patent
Bergerhoff et al.

(10) Patent No.: US 6,998,974 B2
(45) Date of Patent: Feb. 14, 2006

(54) METHOD AND SYSTEM FOR MONITORING THE WHEELS OF MOTOR VEHICLE

(75) Inventors: Nikolas Bergerhoff, Regensburg (DE); Martin Fischer, Regensberg (DE)

(73) Assignee: Siemens Aktiengesellschaft, Munich (DE)

( * ) Notice: Subject to any disclaimer, the term of this patent is extended or adjusted under 35 U.S.C. 154(b) by 240 days.

(21) Appl. No.: 10/279,565

(22) Filed: Oct. 24, 2002

(65) Prior Publication Data
US 2003/0090372 A1 May 15, 2003

(30) Foreign Application Priority Data
Oct. 24, 2001 (DE) ................. 101 52 338

(51) Int. Cl.
*B60C 23/00* (2006.01)
(52) U.S. Cl. .................. 340/444; 340/442; 73/146; 701/29; 701/70
(58) Field of Classification Search ............... 340/442, 340/444; 73/146; 701/29, 70
See application file for complete search history.

(56) References Cited

U.S. PATENT DOCUMENTS

| | | | |
|---|---|---|---|
| 5,442,331 A | 8/1995 | Kishimoto et al. ......... 340/444 |
| 5,569,848 A * | 10/1996 | Sharp ........................ 73/146.2 |
| 5,808,190 A | 9/1998 | Ernst ......................... 73/146.5 |
| 5,844,475 A * | 12/1998 | Horie .......................... 340/442 |
| 5,923,244 A * | 7/1999 | Jones ........................... 340/442 |
| 5,936,519 A * | 8/1999 | Nakajima et al. ........... 340/444 |
| 6,060,983 A * | 5/2000 | Yanase et al. ............... 340/442 |
| 6,102,492 A * | 8/2000 | Diehle et al. ............. 303/113.5 |
| 6,112,587 A | 9/2000 | Oldenettel ................. 73/146.5 |
| 6,204,758 B1 | 3/2001 | Wacker et al. .............. 340/444 |
| 6,237,403 B1 | 5/2001 | Oldenettel et al. ......... 73/146.5 |
| 6,246,316 B1 | 6/2001 | Andsager .................... 340/444 |
| 6,259,361 B1 | 7/2001 | Robillard et al. ........... 340/447 |
| 6,278,363 B1 * | 8/2001 | Bezek et al. ................ 340/442 |
| 6,435,020 B1 | 8/2002 | Oldenettel et al. ......... 73/146.4 |

(Continued)

FOREIGN PATENT DOCUMENTS

DE 4337443 A1 5/1995

(Continued)

*Primary Examiner*—Daniel Wu
*Assistant Examiner*—Samuel J. Walk
(74) *Attorney, Agent, or Firm*—Baker Botts L.L.P.

(57) ABSTRACT

The method comprises the steps of monitoring the wheels (R1, R2, R3, R4) of a motor vehicle having an antilock brake system (ABS), for fault states, in particular for incorrect tire pressures, the occurrence of a fault state and the wheel position (FL, FR, RL, RR) of the wheel (R1, R2, R3, R4) at which the fault state has occurred being indicated. Each wheel (R1, R2, R3, R4) to be monitored is assigned a wheel unit (E1, E2, E3, E4) which monitors the respective wheel (R1, R2, R3, R4) for fault states, and wherein at least the wheel position (FL, FR, RL, RR) of a wheel (R1, R2, R3, R4) at which a fault state has occurred is determined by means of output signals of sensors (S1, S2, S3, S4) of the antilock brake system (ABS).

10 Claims, 2 Drawing Sheets

U.S. PATENT DOCUMENTS

| | | |
|---|---|---|
| 6,446,023 B1 | 9/2002 | Ernst .................. 702/138 |
| 6,571,617 B1 | 6/2003 | Van Niekerk et al. ........ 73/146 |
| 6,580,365 B1 | 6/2003 | Starkey .................. 340/447 |
| 6,633,229 B1 | 10/2003 | Normann et al. .......... 340/447 |
| 2003/0006890 A1 * | 1/2003 | Magiawala et al. ......... 340/438 |

FOREIGN PATENT DOCUMENTS

| | | |
|---|---|---|
| DE | 19608478 A1 | 5/1997 |
| DE | 19849390 C2 | 5/2000 |
| DE | 199 00 082 A1 | 8/2000 |
| DE | 19921413 C1 | 11/2000 |
| DE | 197 20 123 C2 | 3/2001 |
| EP | 0760299 B1 | 7/1996 |
| EP | 0806307 B1 | 5/1997 |
| EP | 0 806 307 B1 | 1/2001 |
| WO | 99/08887 | 7/1998 |

* cited by examiner

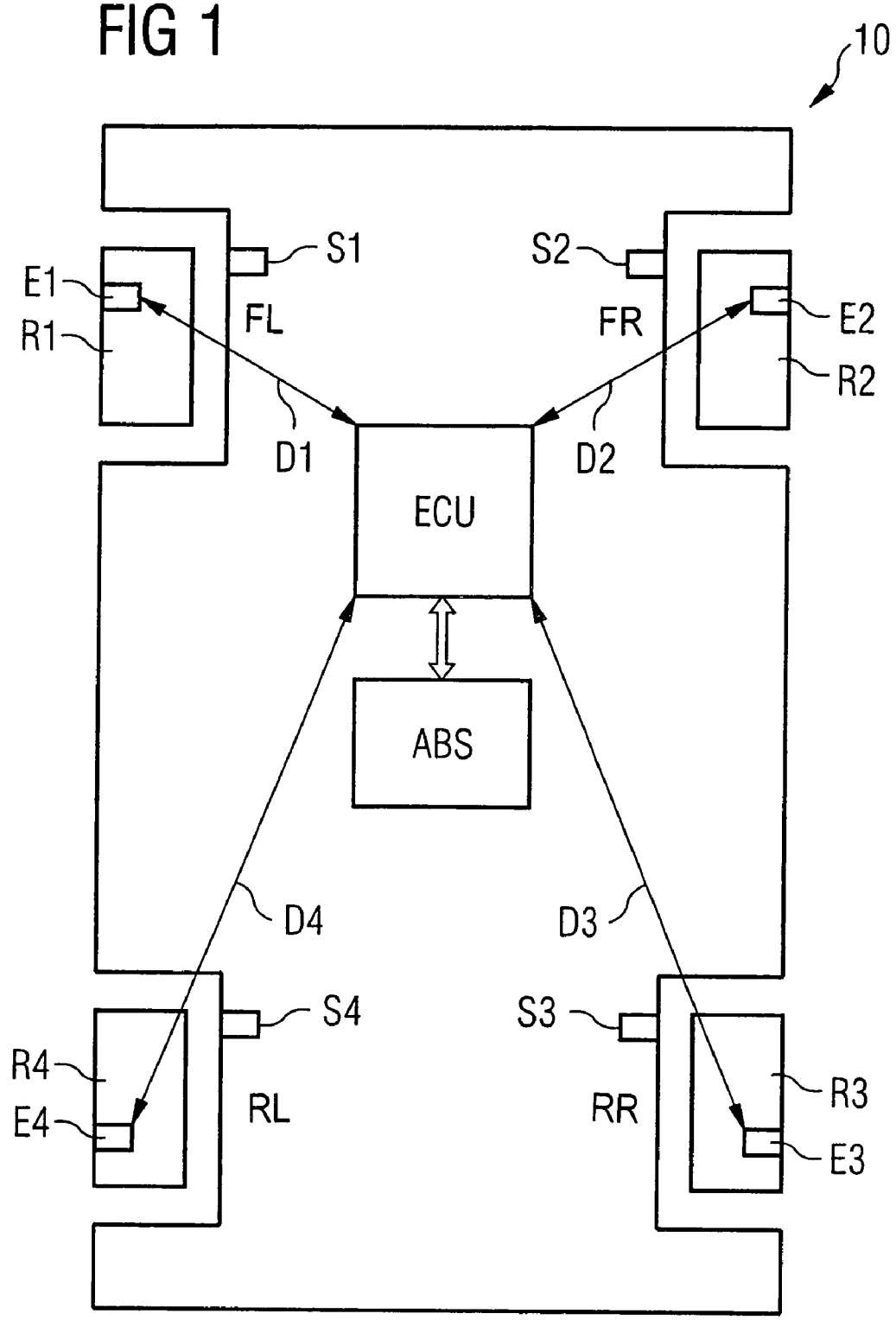

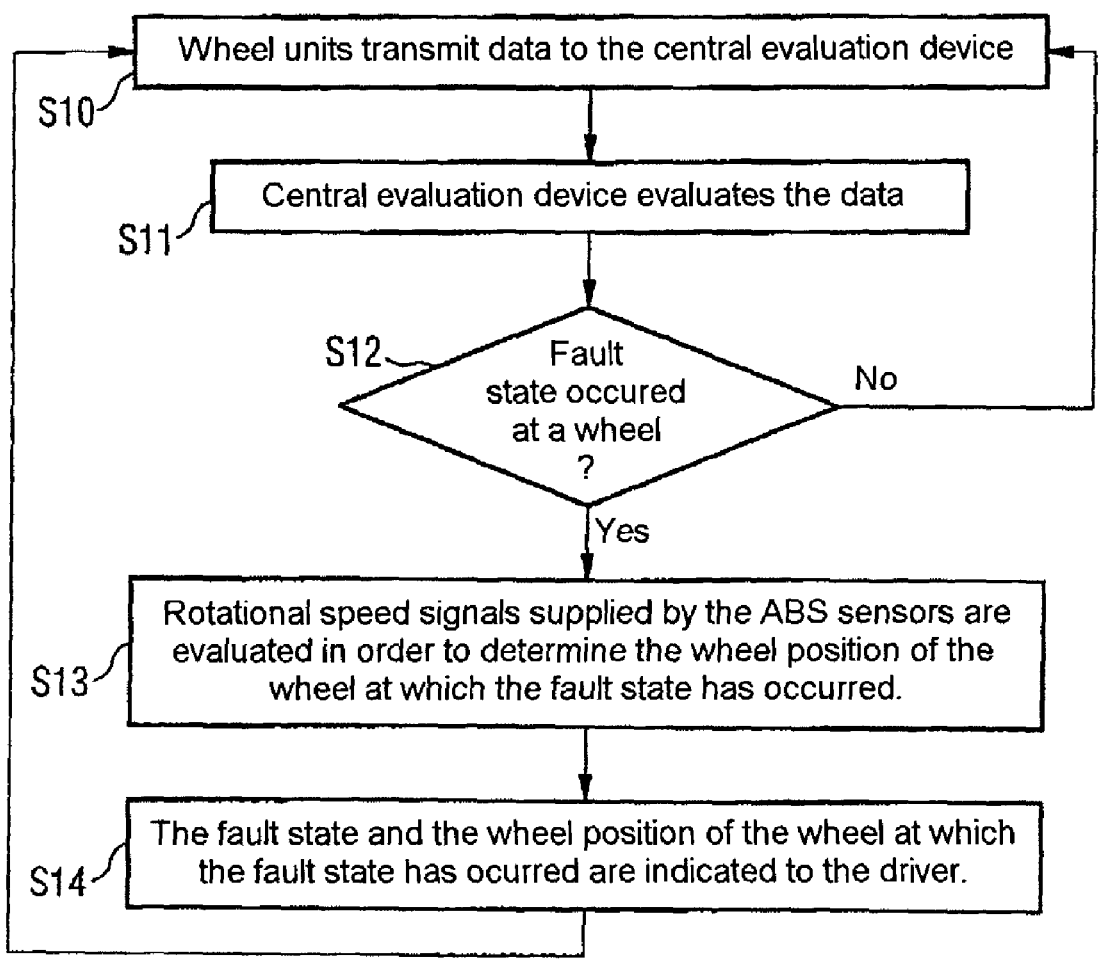

METHOD AND SYSTEM FOR MONITORING THE WHEELS OF MOTOR VEHICLE

BACKGROUND OF THE INVENTION

The invention relates to a method for monitoring the wheels of a motor vehicle having an antilock brake system for fault states, in particular for incorrect tire pressures, the occurrence of a fault state and the wheel position of the wheel at which the fault state has occurred being indicated. In addition, the invention relates to a system for monitoring the wheels of a motor vehicle having an antilock brake system, for fault states, in particular for incorrect tire pressures, the system indicating the occurrence of a fault state and the wheel position of the wheel at which the fault state has occurred.

The term fault state is to be interpreted loosely in the present context and comprises all states which are considered to be worthy of detection.

With respect to the systems of the generic type and the methods of the generic type it is known, for example, that the wheel units transmit information to a central evaluation device, arranged on the chassis of the motor vehicle, by means of radio frequency signals. In their present context, wheel units are to be understood as any unit which rotates with a respective wheel and is suitable for supplying information or data by means of which fault states which possibly occur at the wheel can be detected. In addition to the actual detection of a fault state, provision is made in many systems and methods of the generic type for the wheel position (for example front left, front right, rear left, rear right) of the individual wheels to be determined, so that, when a fault state occurs, the fault state can be indicated together with the respective wheel position.

For example, EP 0 806 307 B1 has already disclosed a method for carrying out the assignment of the wheel position to air pressure monitoring devices in an air pressure monitoring system of a motor vehicle, the motor vehicle having, inter alia, the following components: a number of wheels, each wheel being assigned an air pressure monitoring device which is capable of transmitting an individual identifier to a central processor unit, and a central processor unit in which the assignment of the identifier to an air pressure monitoring device relating to the wheel position for each wheel is stored. In the method known from EP 0 806 307 B1, the assignment of the air pressure monitoring device to the wheel position is performed as follows: an assignment mode is switched on; the individual identifiers of the air pressure monitoring device are output; the central processor unit evaluates which individual identifier has been transmitted from which wheel position; the assignment which is determined in the central processor unit is stored; and the assignment mode is switched off and the air pressure monitoring system is operated in a pressure monitoring mode. In order to evaluate the individual identifiers, there is, in particular, provision here for a specific variable, for example the wheel speed, for each wheel of the motor vehicle to be measured both with a wheel unit of the air pressure monitoring device and with a fixed sensor with a known wheel position. Then, the wheel position of the individual wheels is determined by comparing the output signals of the fixed sensors and the output signals of the wheel units.

DE 197 20 123 C2 also discloses that a separate antenna is to be provided in the region of each wheel to be monitored, which antenna can be used to receive signals emitted by the wheel units. Although each of the antennas can, under certain circumstances, also receive signals from wheel units which are not arranged directly adjacent to the respective antenna, according to the teaching of DE 197 20 123 C2 it is sufficient, for determining the wheel positions of the individual wheels, to assume that a signal which is emitted and received by a directly adjacent wheel unit has a higher signal level than a signal which is received by a more remotely arranged wheel unit.

The known systems and methods have in common the fact that they are very complex and therefore expensive in terms of the hardware and software necessary to determine the wheel positions.

SUMMARY OF THE INVENTION

The invention is based on the object of developing the methods and systems of the generic type in such a way that a wheel at which a fault state has occurred can be assigned to a wheel position with a relatively small amount of expenditure on hardware.

This object is achieved by a method for monitoring the wheels of a motor vehicle having an antilock brake system, for fault states, the occurrence of a fault state and the wheel position of the wheel at which the fault state has occurred being indicated, wherein each wheel to be monitored is assigned a wheel unit which monitors the respective wheel for fault states, and wherein at least the wheel position of a wheel at which a fault state has occurred is determined by means of output signals of sensors of the antilock brake system.

Another method for monitoring the wheels of a motor vehicle having an antilock brake system, for fault states, comprises the steps of:

indicating the occurrence of a fault state and the wheel position of the wheel at which the fault state has occurred, assigning each wheel to be monitored a wheel unit which monitors the respective wheel for fault states, and determining at least the wheel position of a wheel at which a fault state has occurred by means of output signals of sensors of the antilock brake system.

The wheel position of a wheel can be determined by means of the rotational speed of the wheel. A fault state and/or a wheel position can be indicated by generating an audible and/or a visual signal. The fault state may includes a state for incorrect tire pressures.

An embodiment according to the present invention is a system for monitoring the wheels of a motor vehicle having an antilock brake system, for fault states, the system indicating the occurrence of a fault state and the wheel position of the wheel at which the fault state has occurred, wherein for each wheel to be monitored it has a wheel unit which monitors the respective wheel for fault states, and wherein it determines at least the wheel position of a wheel at which a fault state has occurred by means of the output signals of sensors of the antilock brake system.

Another embodiment is a system for monitoring the wheels of a motor vehicle having an antilock brake system, for fault states, which comprises:

a wheel unit for each wheel of the motor vehicle, wherein each wheel unit monitors the respective wheel for fault states, and an evaluation unit which determines the wheel position of a wheel at which a fault state has occurred by means of the output signals of sensors of the antilock brake system.

The system can determine the wheel position of a wheel by means of the rotational speed of the wheel. The system can further indicate a fault state and/or a wheel position audibly and/or visually. The fault state may include a state for incorrect tire pressures.

The method according to the invention is based on the prior art of the generic type in that each wheel to be monitored is assigned a wheel unit which monitors the respective wheel for fault states, and in that at least the wheel position of a wheel at which a fault state has occurred is determined by means of output signals of sensors of the antilock brake system. As a result of this solution it is, for example, no longer absolutely necessary for the wheel units to transmit individual identifiers to the central evaluation device, as a result of which the wheel units can be implemented with a smaller degree of expenditure on hardware and software, which reduces costs. In the case of tire pressure monitoring, the wheel units permit more precise measurement of the air pressure than is possible by means of the output signals of the sensors of the antilock brake system, with the result that the invention combines the precision of measurement results which can be achieved using wheel units with the cost-effective assignment of the wheels to wheel positions by means of the antilock brake system.

In one particularly preferred embodiment of the method according to the invention, there is provision for the wheel position of a wheel to be determined by means of the rotational speed of the wheel. If, for example, the tire pressure of a wheel drops, the effective radius of this wheel is reduced, which leads to the wheel rotating more quickly than the other wheels. By means of this difference in rotational speeds it is possible for example, to determine the position of a wheel with its excessively low air pressure.

With the method according to the invention there is preferably also provision for a fault state and/or a wheel position to be indicated by generating an audible and/or a visual signal. Here, embodiments are also possible in which a specific wheel state, for example the tire pressure, is indicated permanently or at the driver's request and in which an audible signal is generated if the current value of the monitored variable leaves a predefined value range.

Any system which is suitable for carrying out embodiments of the method according to the invention falls within the scope of protection of the associated claims.

The system is based on the prior art of the generic type in that each wheel to be monitored has a wheel unit which monitors the respective wheel for fault states, and in that it determines at least the position of a wheel at which the fault state has occurred, by means of the output signals for sensors of the antilock brake system. As a result, the advantages explained in conjunction with the method according to the invention are obtained in an identical or similar way, for which reason reference is made to the corresponding explanations in order to avoid repetitions.

The same applies appropriately to the following preferred embodiments of the system according to the invention, reference also being made to the respective explanations relating to the method according to the invention with respect to the advantages which can be achieved by means of these embodiments.

In preferred embodiments of the system according to the invention there is also provision for the wheel position of the wheel to be determined by means of the rotational speed of the wheel.

Furthermore, with the system according to the invention it is possible to provide that it displays a fault state and/or a wheel position audibly and/or visually.

The invention is based on the recognition that it is possible, with a degree of expenditure on hardware and software which is lower than in the prior art, to monitor the wheels of a motor vehicle having an antilock brake system, for fault states with a high degree of precision, and to indicate the presence of the fault state and the wheel position of the wheel at which the fault state has occurred by virtue of the fact that the wheel units detect a fault state with a high degree of precision, and the position of the wheel at which a fault state has occurred are determined by means of the output signals of the sensors of the antilock brake system. Here, the assignment of the wheels to wheel positions can be made possible, for example, by correspondingly expanded software for the control unit of the antilock brake system.

BRIEF DESCRIPTION OF THE DRAWINGS

The invention will now be explained by way of example using preferred embodiments and with reference to the appended drawings, in which:

FIG. 1 shows a schematic block diagram of a motor vehicle which has an embodiment of the system according to the invention; and FIG. 2 shows a flowchart which illustrates an embodiment of the method according to the invention.

DETAILED DESCRIPTION OF THE PREFERRED EMBODIMENTS

FIG. 1 shows a schematic block diagram of a motor vehicle which has an embodiment of the system according to the invention. Here, the entire motor vehicle is provided with the reference symbol 10. The motor vehicle 10 has four wheels R1, R2, R3, R4. Each of the wheels R1, R2, R3, R4 is assigned a wheel unit E1, E2, E3, E4 which can be arranged, for example, in the tire and/or in the region of the valve of the respective wheel R1, R2, R3, R4. The wheel position front left is referred to as FL, the wheel position front right is referred to as FR, the wheel position rear left is referred to as RL and the wheel position rear right is referred to as RR. In the region of the wheels R1, R2, R3, R4, a sensor S1, S2, S3, S4 of the antilock brake system ABS is arranged in each case on the chassis in a manner known per se, the connecting lines between the sensors S1, S2, S3, S4 to the ABS control unit not being illustrated. The antilock brake system ABS is connected to a central evaluation device ECU or is formed integrally with it. The wheel units E1, E2, E3, E4 have suitable transmitting devices in order to transmit data D1, D2, D3, D4 to the central evaluation device ECU, for example by means of radio-frequency radio signals. By means of this data D1, D2, D3, D4, the central evaluation device ECU can determine whether a fault state has occurred at a wheel R1, R2, R3, R4. However, according to the invention the data D1, D2, D3, D4 is not suitable for determining which wheel R1, R2, R3, R4 is located at which wheel position FL, FR, RL, RR. In the event of, for example, the tire pressure in wheel R2 dropping, the central evaluation device ECU detects only that the tire pressure at one of the monitored wheels R1, R2, R3, R4 is too low. Then, the signal supplied by the sensors S1, S2, S3, S4 of the antilock brake system ABS are evaluated by the central evaluation device ECU or by the control unit of the antilock brake system ABS itself. For example in the case of steady-state straight-ahead travelling of the motor vehicle 10, owing to the excessively low tire pressure the wheel R2 turns more quickly than the wheels R1, R3 and R4, so that by means of the rotational speed of the wheel R2 it is possible to determine that the wheel R2 is located at the front-right wheel position FR.

FIG. 2 shows a flowchart which illustrates an embodiment of the method according to the invention, the reference symbols which are used in the following explanation relating to FIG. 1. In step S10, the wheel units E1, E2, E3, E4 transmit data D1, D2, D3, D4 to the central evaluation device ECU. The data D1, D2, D3, D4 here can contain, for example, information relating to the respective tire pressures. In step S11, the central evaluation device ECU evaluates the data D1, D2, D3, D4. For example, the central evaluation device ECU compares the tire pressures represented by the data D1, D2, D3, D4 with the predefined threshold values in order to determine whether the tire pressure of one of the wheels R1, R2, R3, R4 is too high or too low. In step 12 it is checked whether a fault state has occurred at a wheel R1, R2, R3, R4. If no fault state has occurred, the system branches back to step S10. Otherwise, the system continues with step S13 in which the rotational speed signal supplied by the ABS sensors S1, S2, S3, S4 are evaluated in order to determine the wheel position FL, FR, RL, RR of the wheel R1, R2, R3, R4 at which the fault state has occurred. For example when the tire pressure is excessively high the effective radius of the wheel R1, R2, R3, R4 is increased so that its rotational speed is reduced in comparison to a wheel R1, R2, R3, R4 with the correct tire pressure. Correspondingly, a tire pressure which is excessively low leads to a reduced effective radius of the wheel R1, R2, R3, R4 so that its rotational speed is increased in comparison to a wheel R1, R2, R3, R4 with the correct tire pressure. After the wheel position FL, FR, RL, RR of the wheel R1, R2, R3, R4 at which the fault state has occurred has been determined in step S13, the system progresses to step S14 in which the fault state and the wheel position FL, FR, RL, RR of the wheel R1, R2, R3, R4 at which the fault state has occurred is indicated to the driver.

The features of the invention which are disclosed in the present description, in the drawings and in the claims can be essential for the implementation of the invention, both individually and in any desired combination.

What is claimed is:

1. A method for monitoring wheels of a motor vehicle having an antilock brake system for fault states, such that upon occurrence of a fault state, the position of the wheel at which the fault state occurred is indicated, comprising:
   assigning a wheel unit to each wheel to be monitored, the wheel unit monitoring tire inflation pressures in the wheels for fault states comprising high and low tire pressures, said wheel units transmitting only fault state signals to a central evaluation unit that a fault state has occurred in at least one wheel,
   evaluating signals supplied by antilock brake system sensors for determining the position of any wheel at which a fault state has occurred by means of output signals from the antilock brake system sensors corresponding to known wheel locations signaling wheel rotational speeds, wherein an under-inflated tire of reduced effective radius has a faster rotational speed comparatively, and an over-inflated tire of increased effective radius has a slower rotational speed comparatively.

2. The method as claimed in claim 1, wherein a fault state and/or a wheel position are indicated by generating an audible signal.

3. The method as claimed in claim 1, wherein a fault state and/or a wheel position are indicated by generating a visual signal.

4. A system for monitoring wheels of a motor vehicle having an antilock brake system for fault states, the system indicating occurrence of a fault state and the position of the wheel at which the fault state has occurred, wherein each wheel to be monitored has a corresponding wheel unit to monitor tire inflation pressures in the wheels for fault states comprising low and high tire pressures, the system evaluates the position of a wheel at which a fault state has occurred by means of output signals from antilock brake system sensors corresponding to known wheel locations signaling wheel rotational speeds, wherein an under-inflated tire of reduced effective radius has a faster rotational speed comparatively, and an over-inflated tire of increased effective radius has a slower rotational speed comparatively.

5. The system as claimed in claim 4, wherein it indicates a fault state and/or a wheel position audibly.

6. The system as claimed in claim 4, wherein it indicates a fault state and/or a wheel position visually.

7. A method for monitoring the wheels of a motor vehicle having an antilock brake system for fault states, comprising the steps of:
   assigning a wheel unit to each wheel of a motor vehicle to monitor tire inflation pressures in the wheels for fault states comprising low and high tire pressures, said wheel unit sending only fault state signals when a fault state occurs; and
   evaluating the wheel position of a wheel at which a fault state has occurred by means of output signals from antilock brake system sensors corresponding to each wheel location.

8. The method as claimed in claim 7, wherein the wheel position of a wheel is determined by means of the rotational speed of the wheel.

9. The method as claimed in claim 7, wherein a fault state and/or a wheel position are indicated by generating an audible signal.

10. The method as claimed in claim 7, wherein a fault state and/or a wheel position are indicated by generating a visual signal.

* * * * *